2,894,955

ORGANIC COMPOUNDS

Brooke D. Aspergren and Robert B. Moffett, Kalamazoo, Mich., assignors to The Upjohn Company, Kalamazoo, Mich., a corporation of Michigan No Drawing. Application November 19, 1956
Serial No. 622,806

5 Claims. (Cl. 260—313)

The present invention relates to novel organic compounds and is more particularly concerned with the novel 2,2 - dimethyl - α-phenyl-α-isopropyl-1-pyrrolidinebutyronitrile free base, 2,2-dimethyl-α-phenyl-α-isopropyl-1-pyrrolidinebutyramide free base and 2,2-dimethyl-α-phenyl-α-isopropyl-1-pyrrolidinebutyramide acid addition salts.

The 2,2 - dimethyl-α-phenyl-α-isopropyl-1-pyrrolidinebutyronitrile free base and 2,2-dimethyl-α-phenyl-α-isopropyl-1-pyrrolidinebutyramide free base are useful intermediates for the preparation of 2,2-dimethyl-α-phenyl-α-isopropyl - 1 - pyrrolidinebutyramide acid addition salts. The acid addition salts of the present invention possess unusually good therapeutic properties; these compounds possess excellent oxytocic activity but do not possess any substantial degree of anticholinergic activity (antispasmodic or antisecretory activity). The acid addition salts of related primary amides possess anticholinergic activity to some extent but possess little if any oxytocic activity. These related compounds fail to show the particular combination of pharmacological activity which is demonstrated by the acid addition salts of the present invention, i.e., excellent oxytocic activity with very little anticholinergic activity. The present invention is indicated, therefore, where good oxytocic activity is required and where side effects due to anticholinergic activity are undesired.

The data given in Table I are illustrative of the differentiating effects noted between the acid addition salts of the present invention and related acid addition salts. The antispasmodic index was determined by intravenous administration to Thiry-Vella dogs and equated to atropine equals 1.0 (low values mean low activity). The antisecretory activity was determined intravenously in rats and is given as the ED in mg./kg.—the effective dose necessary to reduce gastric secretion by the percentage indicated in the table. Oxytocic activity was determined intravenously in cats at a dose of one mg./kg. and rated in the following order of stimulation: Pronounced, Slight, and Nil.

TABLE I

| Compound | Anticholinergic Activity | | Oxytocic Activity | |
|---|---|---|---|---|
| | Antispasmodic Index | Antisecretory Activity | Rating | Dose, mg./kg. |
| [structure with .HCl] | <0.15 | Inactive at 0.1 mg./kg. | P | 1.0 |
| Related Compounds | | | | |
| A. [structure with .HCl] | 0.2 | 50 percent at 0.2 mg./kg. | S | 1.0 |
| B. [structure with .HCl] | <0.15 | 24 percent at 0.1 mg./kg. | S | 1.0 |
| C. [structure with Br−] | 0.2 | 30 percent at 0.1 mg./kg. | N | 1.0 |
| D. [structure with .HCl] | <0.15 | 18 percent at 1 mg./kg. | S | 1.0 |

The data in Table I show that 2,2-dimethyl-α-phenyl-α-isopropyl-1-pyrrolidinebutyramide hydrochloride possesses an unique combination of properties which would not be expected from the properties of closely related compounds. Thus, the acid addition salts of the invention possess a combination of unusually high oxytocic activity with very little anticholinergic activity, which combination of properties is not possessed by the related compounds. For example, Compounds A and B combine mild antisecretory and poor antispasmodic activity with slight oxytocic activity. Compound C combines poor antispasmodic and mild antisecretory activity with no oxytocic activity. Compound D combines slight oxytocic activity with mild antisecretory activity and poor antispasmodic activity.

The compounds of the present invention can be prepared by reacting α-phenyl-α-isopropylacetonitrile in the presence of an alkali metal amide, advantageously sodium amide, with 1-(2-chloroethyl)-2,2-dimethylpyrrolidine to produce 2,2-dimethyl-α-phenyl-α-isopropyl-1-pyrrolidinebutyronitrile free base. This free base is hydrolyzed to produce 2,2-dimethyl-α-phenyl-α-isopropyl-1-pyrrolidinebutyramide free base according to the procedure of Cheney et al., J. Org. Chem. 17, 770 (1952). The desired 2,2-dimethyl-α-phenyl-α-isopropyl-1-pyrrolidinebutyramide acid addition salts are thereupon produced by reacting the free base in an inert solvent such as ethyl acetate with an acid such as hydrochloric acid, hydrobromic acid, sulfuric acid, acetic acid, phosphoric acid, citric acid, lactic acid, and the like.

The following example is illustrative of the process and products of the present invention, but is not to be construed as limiting.

EXAMPLE 2,2 - dimethyl - α-phenyl-α-isopropyl-1-pyrrolidinebutyramide hydrochloride (A) 1 - (2 - chloroethyl)-2,2-dimethylpyrrolidine.—A solution of 1-(2-chloroethyl)-2,2-dimethylpyrrolidine was prepared from ninety grams (0.454 mole) of the corresponding hydrochloride [Moffett et al., J. Am. Chem. Soc. 77, 1565 (1955)] by treating the hydrochloride with concentrated aqueous sodium hydroxide solution, extracting the mixture with toluene, and drying the toluene solution with anhydrous potassium carbonate.

(B) 2,2 - dimethyl-α-phenyl-α-isopropyl-1-pyrrolidinebutyronitrile free base.—A mixture of 71.6 grams (0.454 mole) of α-phenyl-α-isopropylacetonitrile [Shirley, "Preparation of Organic Intermediates," John Wiley and Sons, Inc., New York, N. Y., 1951, page 252], 19.5 grams of sodium amide and one liter of dry toluene was heated under reflux with stirring for four hours. The solution of 1-(2-chloroethyl)-2,2-dimethylpyrrolidine, part A, was gradually added to the reaction mixture and the mixture was heated under reflux with stirring for fifteen hours. The mixture was cooled, washed with water, and the toluene layer was then extracted with dilute hydrochloric acid. The free base was liberated from the aqueous acid solution by adding an excess of twenty percent sodium hydroxide solution, and the mixture was extracted with benzene. The benzene extract was dried with anhydrous sodium sulfate and after removal of the solvent by distillation, the residue was distilled twice under reduced pressure, giving a 44 percent yield of 2,2-dimethyl-α-phenyl-α-isopropyl-1-pyrrolidinebutyronitrile free base having a boiling point of 120 degrees centigrade at 0.015 millimeter pressure and $N_D^{25}$=1.5090.

(C) 2,2 - dimethyl-α-phenyl-α-isopropyl-1-pyrrolidinebutyramide free base.—A mixture of 25 grams of 2,2-dimethyl - α-phenyl-α-isopropyl-1-pyrrolidinebutyronitrile free base, part B, 50 milliliters of concentrated sulfuric acid and five milliliters of water was heated on a steam bath with stirring for three and one-half hours. The mixture was poured onto ice, made basic with ammonium hydroxide, and extracted with benzene. The benzene extract was dried with anhydrous sodium sulfate and the solvent was removed by distillation to produce 2,2-dimethyl-α-phenyl-α-isopropyl-1-pyrrolidinebutyramide free base as a yellow gum.

(D) 2,2 - dimethyl - α-phenyl-α-isopropyl-1-pyrrolidinebutyramide hydrochloride.—The free base, part C, was dissolved in ethyl acetate and acidified with ethanolic hydrogen chloride to produce a yellow precipitate which was collected and recrystallized from isopropanol. The resulting 2,2-dimethyl-α-phenyl-α-isopropyl-1-pyrrolidinebutyramide hydrochloride had a melting point of 226 to 228 degrees centigrade and had the following analysis:

Analysis.—Calculated for $C_{19}H_{31}ClN_2O$: C, 67.33; H, 9.22; N, 8.27; Cl, 10.46. Found: C, 67.03; H, 8.91; N, 8.29; Cl, 10.25

Following the procedure of part D, above, other acid addition salts such as 2,2-dimethyl-α-phenyl-α-isopropyl-1-pyrrolidinebutyramide sulfate, 2,2-dimethyl-α-phenyl-α-isopropyl-1-pyrrolidinebutyramide hydrobromide, 2,2-dimethyl - α-phenyl-α-isopropyl-1-pyrrolidinebutyramide acetate, 2,2 - dimethyl-α-phenyl-α-isopropyl-1-pyrrolidinebutyramide phosphate, 2,2-dimethyl-α-phenyl-α-isopropyl-1-pyrrolidinebutyramide citrate, 2,2-dimethyl-α-phenyl-α-isopropyl-1-pyrrolidiniebutyramide lactate, and the like can be produced by substituting the corresponding acid for hydrogen chloride.

It is to be understood that the invention is not to be limited to the exact details of operation or exact compounds shown and described, as obvious modifications and equivalents will be apparent to one skilled in the art, and the invention is therefore to be limited only by the scope of the appended claims.

We claim:

1. 2,2 - dimethyl - α-phenyl-α-isopropyl-1-pyrrolidinebutyronitrile free base.

2. 2,2 - dimethyl - α-phenyl-α-isopropyl-1-pyrrolidinebutyramide free base.

3. 2,2 - dimethyl - α-phenyl-α-isopropyl-1-pyrrolidinebutyramide non-toxic acid addition salts.

4. 2,2 - dimethyl - α-phenyl-α-isopropyl-1-pyrrolidinebutyramide hydrochloride.

5. A compound selected from the group consisting of 2,2 - dimethyl - α-phenyl-α-isopropyl-1-pyrrolidinebutyronitrile free base and 2,2-dimethyl-α-phenyl-α-isopropyl-1-pyrrolidinebutyramide free base.

References Cited in the file of this patent

UNITED STATES PATENTS 2,782,206     Aspergren _____ Feb. 19, 1957

FOREIGN PATENTS 504,085     Belgium _____ July 14, 1951

OTHER REFERENCES

Janssen et al.: Arc. Intern Pharmacodynamie, vol. 103, pp. 82 and 89–90 (1955).